United States Patent
Zhu et al.

(10) Patent No.: US 11,296,817 B2
(45) Date of Patent: Apr. 5, 2022

(54) METHOD AND NETWORK NODE, FOR HANDLING LINK ADAPTION OF A CHANNEL

(71) Applicant: Telefonaktiebolaget LM Ericsson (publ), Stockholm (SE)

(72) Inventors: Huaisong Zhu, Beijing (CN); Qi Qin, Beijing (CN); Christian Skärby, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/966,469

(22) PCT Filed: Mar. 13, 2018

(86) PCT No.: PCT/CN2018/078774
§ 371 (c)(1),
(2) Date: Jul. 31, 2020

(87) PCT Pub. No.: WO2019/173957
PCT Pub. Date: Sep. 19, 2019

(65) Prior Publication Data
US 2021/0036804 A1 Feb. 4, 2021

(51) Int. Cl.
*H04L 1/00* (2006.01)
(52) U.S. Cl.
CPC .......... *H04L 1/0019* (2013.01); *H04L 1/0035* (2013.01)
(58) Field of Classification Search
CPC .................. H94L 1/0019; H94L 1/0035
See application file for complete search history.

(56) References Cited

U.S. PATENT DOCUMENTS

2003/0129943 A1* 7/2003 Park ............ H04B 7/18597
455/13.4
2012/0300739 A1 11/2012 Froberg Olsson et al.
(Continued)

FOREIGN PATENT DOCUMENTS

| CN | 105024781 A | 11/2015 | |
|---|---|---|---|
| EP | 2139141 A2 * | 12/2009 | ............ H04L 1/0003 |
| EP | 2139141 A2 | 12/2009 | |

OTHER PUBLICATIONS

International Search Report and Written Opinion for International Application No. PCT/CN2018/078774, dated Jun. 28, 2018, 7 pages.
(Continued)

*Primary Examiner* — Jamal Javaid
(74) *Attorney, Agent, or Firm* — NDWE LLP

(57) ABSTRACT

A method performed by a network node, for handling link adaption (LA) of a channel. The network node obtains a channel quality value for each Transmission Time Interval (TTI) in a set of TTIs. The network node estimates a probability that a specific channel quality will occur from the obtained channel quality values for the set of TTIs based on a distribution of channel quality values. The network node further determines a set of transmission parameters which optimizes a target function of LA, based on the estimated probability for the channel quality, wherein each set of transmission parameters is mapped to a channel quality which is required for a successful reception.

16 Claims, 14 Drawing Sheets

(56) References Cited

U.S. PATENT DOCUMENTS

| | | | |
|---|---|---|---|
| 2013/0343290 A1* | 12/2013 | Ren | H04L 5/0046 370/329 |
| 2014/0133848 A1 | 5/2014 | Koike-Akino et al. | |
| 2017/0155471 A1 | 6/2017 | Madan et al. | |

OTHER PUBLICATIONS

Robert C. Daniels et al., "Link Adaptation in MIMO-OFDM with Non-Uniform Constellation Selection Over Spatial Streams Through Supervised Learning," 2010, pp. 3314-3317, IEEE.

Robert C. Daniels et al., "An Online Learning Framework for Link Adaptation in Wireless Networks," 2009, 3 pages, IEEE.

Robert C. Daniels et al., "A Supervised Learning Approach to Adaptation in Practical MIMO-OFDM Wireless Systems," 2008, 5 pages, IEEE.

Tushar Desai et al., "Energy Efficient Link Adaptation Using Machine Learning Techniques for Wireless OFDM," 2016, 4 pages, IEEE.

Raja Karmakar et al., "Dynamic Link Adaptation in IEEE 802.11ac: A Distributed Learning Based Approach," 2016, pp. 87-94, IEEE.

Zrinka Puljiz et al., "A Machine Learning Approach to Link Adaptation for SC-FDE System," 2011, 5 pages, IEEE.

Alberto Rico-Alvarino et al., "Learning Based Link Adaptation in Multiuser MIMO-OFDM," 2013, 5 pages, EUSIPCO.

Sungho Yun et al., "Reinforcement Learning for Link Adaptation in MIMO-OFDM Wireless Systems," 2010, 5 pages, IEEE.

Extended European Search Report for EP Application No. 18909727.2 dated Sep. 24, 2021, 12 pages.

Ahmed Almradi et al., "DA and NDA SINR Estimation in Non Gaussian Noise," pp. 642-646, 2015 IEEE Wireless Communications and Networking Conference (WCNC 2015)—Track 1: PHY and Fundamentals.

* cited by examiner

METHOD AND NETWORK NODE, FOR HANDLING LINK ADAPTION OF A CHANNEL

CROSS-REFERENCE TO RELATED APPLICATIONS

This application is a National stage of International Application No. PCT/CN2018/078774, filed Mar. 13, 2018, which is hereby incorporated by reference.

TECHNICAL FIELD

Embodiments herein relate to a method and a network node, for handling link adaption (LA) of a channel. Furthermore, a computer program and a computer readable storage medium are also provided herein.

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNodeB (gNB) as denoted in New Radio (NR), which may also be referred to as 5G. A service area or cell area is a geographical area where radio coverage is provided by the radio network node. The radio network node communicates over an air interface, which may also be referred to as a channel or a radio link, operating on radio frequencies with the wireless device within range of the radio network node. Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Link adaptation in general is the concept of adjusting parameters related to the transmission of some information over a channel, i.e. the "link" which you want to adapt to, in order to meet certain objectives. While it is generally needed in some form in all systems which deal with information transfer, it is particularly challenging in wireless systems as the properties of the channel tends to change at a relatively rapid pace.

A very common objective is to minimize the resource consumption while retaining a certain desired level of robustness and where the resource consumption and robustness are related so that higher resource consumption means higher robustness and vice versa. Two very common examples of this is when the parameter to adjust is either an amount of channel coding (more coding→more resources are needed to transmit the same amount of information) or a transmit power.

In traditional circuit switched systems designed to carry conversational voice, the desired level of robustness is typically derived based on user perception of voice quality, such as e.g. a maximum frequency of lost frames. A well adopted strategy to do link adaptation in such systems is to try to maintain a certain rate of decoding errors, which may also be referred to as the Block Error Rate (BLER). The rate of BLER which is desired to achieve may be referred to as the "BLER target".

The rationale behind this strategy is simple: Assuming that the BLER target corresponds to what an average user considers good speech quality, then if the BLER is below the target it is possible to save resources by decreasing the robustness without sacrificing user experience, while if it is above the target the robustness must be increased in order to achieve the desired user experience.

For packet switched connections used to carry internet traffic the requirements look a bit different. In order to get good performance, the levels of packet loss rates may be low compared to the speech case discussed above. Lower than 1% BLER is not something which rhymes well with wireless connections in general, due to the potentially rapid changes of the channel.

In contrast to voice however, Internet traffic is relatively tolerable to delay and this leaves room for a sender to buffer transmitted packets and retransmit them if they end up lost. This requires a receiver to send some feedback to the transmitter and such schemes are generally referred to as Automatic Repeat reQuest schemes (ARQ). In systems where Forward Error Correction (FEC) is employed there also exists the opportunity to improve the efficiency by combining the FEC and the ARQ into Hybrid ARQ (HARQ) where the receiver combines the received signals for each transmission of the same data before the FEC and therefore utilizes all transmissions, not just the last one (which is the case for a pure ARQ scheme).

With the addition of ARQ and HARQ in particular, the BLER becomes disconnected from the end user experience since a decoding error does not necessarily result in loss of data. In theory, HARQ can more or less replace link adaptation since the transmitter can just keep sending redundant versions of the same data until the accumulated robustness is sufficient for decoding.

In practice however, the feedback delay and resolution as well as the reliability of the feedback channel makes such an approach infeasible in many cases. Although it basically lacks any connection to the end user experience, the BLER target approach is still to this date used to do link adaptation also for packet switched internet data. The only difference compared to the circuit switched voice case is that a BLER target of 10% is often used, in comparison to ~1% for circuit switched voice.

Traditional LA uses certain methods, such as e.g. outer loop and inner loop, to estimate a Signal to Interference plus Noise Ratio (SINR) value representing the wireless channel condition. A Modulation and Coding Scheme (MCS) value which has a fix BLER target is then mapped based on this SINR, in order to keep the correctness of wireless transmission.

In some advanced LA research, high complexity supervised learning methods are used to obtain performance gain.

In traditional LA, even when interference caused by neighboring cells, i.e. a constant bias for outer loop LA to converge, are ignored, real traffic volume burst characteristics will make BLER measurement confidence range too large to get satisfied converge speed, when based on measurement in live network. The interference from one cell on another cell may also be referred to as flash light effect.

When neighboring cell flash light effect is considered, this problem becomes even more serious. Different neighboring cell scheduling will make channel quality, such as e.g. SINR, jump up and down very quickly. This kind of changing channel quality is hard to trace.

SUMMARY

It is an object of embodiments herein to enhance performance of a wireless communications network, in particular by providing a method for handling link adaption of a channel.

According to a first aspect of embodiments herein the object is achieved by a method performed by a network node, for handling link adaption (LA) of a channel. The network node obtains a channel quality value for each Transmission Time Interval (TTI) in a set of TTIs. The network node estimates a probability that a specific channel quality will occur from the obtained channel quality values for the set of TTIs based on a distribution of channel quality values. The network node further determines a set of transmission parameters which optimizes a target function of LA, based on the estimated probability for the channel quality, wherein each set of transmission parameters is mapped to a channel quality which is required for a successful reception.

According to an aspect of embodiments herein the object is achieved by a network node for performing a method for handling LA of a channel. The network node is configured to obtain a channel quality value for each TTI in a set of TTIs. The network node is configured to estimate a probability that a specific channel quality will occur from the obtained channel quality values for the set of TTIs based on a distribution of channel quality values. The network node is further configured to determine a set of transmission parameters which optimizes a target function of LA, based on the estimated probability for the channel quality, wherein each set of transmission parameters is mapped to a channel quality which is required for a successful reception.

It is furthermore provided herein a computer program comprising instructions, which, when executed on at least one processor, cause the at least one processor to carry out any of the methods above, as performed by the network node. It is additionally provided herein a carrier containing the computer program comprising instructions which, when executed on at least one processor, cause the at least one processor to carry out any of the methods above, as performed by the network node, wherein the carrier is one of an electronic signal, optical signal, radio signal, or a computer readable storage medium.

The embodiments herein provide a method for continuously estimating the distribution of channel quality values and for optimizing a target function of link adaption based on the distribution of the channel quality values from a statistical point of view. This avoids the confidence range issues related to outer loop adjustment LA. This allows for a straight forward maximization of expected throughput in the system, something which is not possible to achieve with an outer loop with a fixed BLER target. Hence, embodiments herein provide an improved LA. Thereby the performance and the capacity of the wireless communications network can be improved.

DETAILED DESCRIPTION OF PREFERRED EMBODIMENTS

Figure 1:
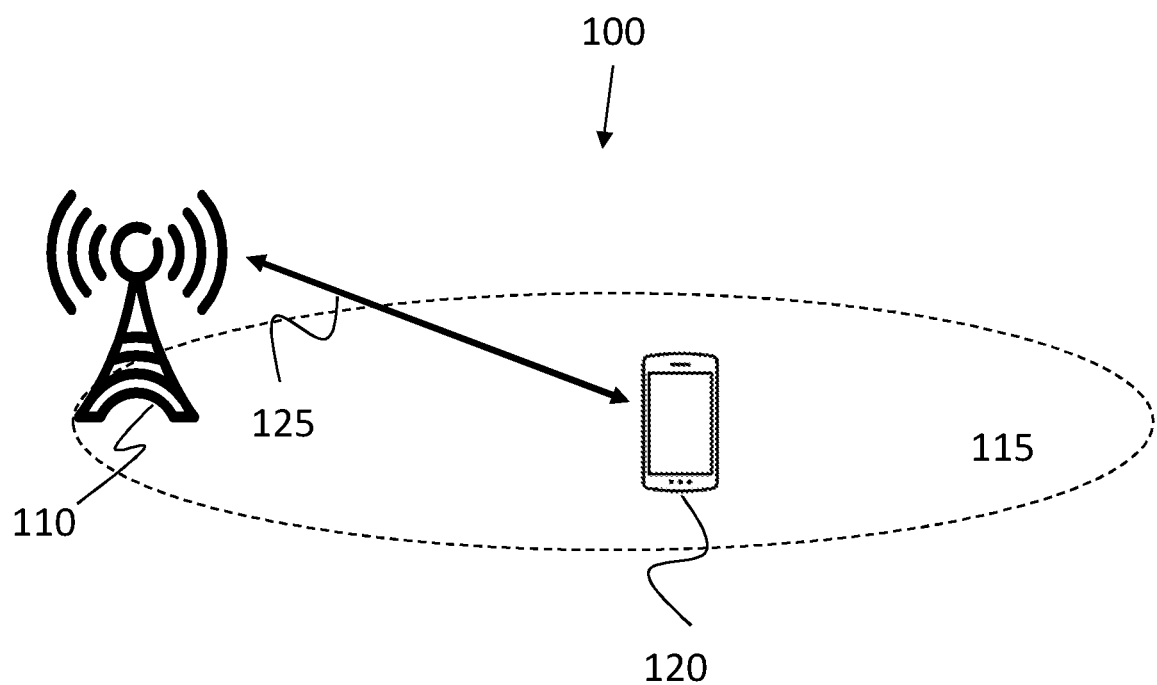
FIG. 1 is a graph illustrating the performance of traditional methods for link adaption.

FIG. 1 is a block diagram illustrating an example wireless communication network, according to some of the embodiments herein. The wireless communication network 100 comprises one or more User Equipment (UE) 120, such as e.g. mobile phones, smart phones, laptop computers, tablet computers, Machine-Type Communication (MTC) devices, or any other devices that can provide wireless communication and a network node 110, such as e.g. a base station, an eNB or a gNB. The UE 120 may also be referred to as a wireless device. The network node 110 serves a coverage area 115, which may also be referred to as e.g. a cell or a beam. In general, UEs 120 that are within coverage of the network node 110, such as e.g., within the cell 115 served by network node 110, communicate with the network node 110 by transmitting and receiving wireless signals over a radio channel 125, which may also be referred to as a link. Adjusting parameters related to the transmission of information over the channel, i.e. the "link" which you want to adapt to, in order to meet certain objectives is commonly referred to as Link Adaption (LA). For example, the UE 120 and network node 110 may communicate wireless signals 125 containing voice traffic, data traffic, and/or control signals. When the network node 110 is communicating voice traffic, data traffic, and/or control signals to the UE 120 it may be referred to as a serving network node for the UE 120. The wireless signals 125 may include both downlink transmissions, i.e. from the network node 110 to the UE 120, and uplink transmissions, i.e. from the UE 120 to the network node 110. Each network node 110 may have a single transmitter or multiple transmitters for transmitting signals 125 to the UE 120. In some embodiments, the network node 110 may comprise a multi-input multi-output (MIMO) system. Similarly, each UE 120 may have a single receiver or multiple receivers for receiving signals 125 from the network node 110 or other UEs. Vice versa, the network node 110 may have a single receiver or multiple receivers for receiving signals 125 transmitted from the UE 120 or other network nodes, and the UE 120 may have a single transmitter or multiple transmitters for transmitting signals 125 to the network node 110.

Figure 2:
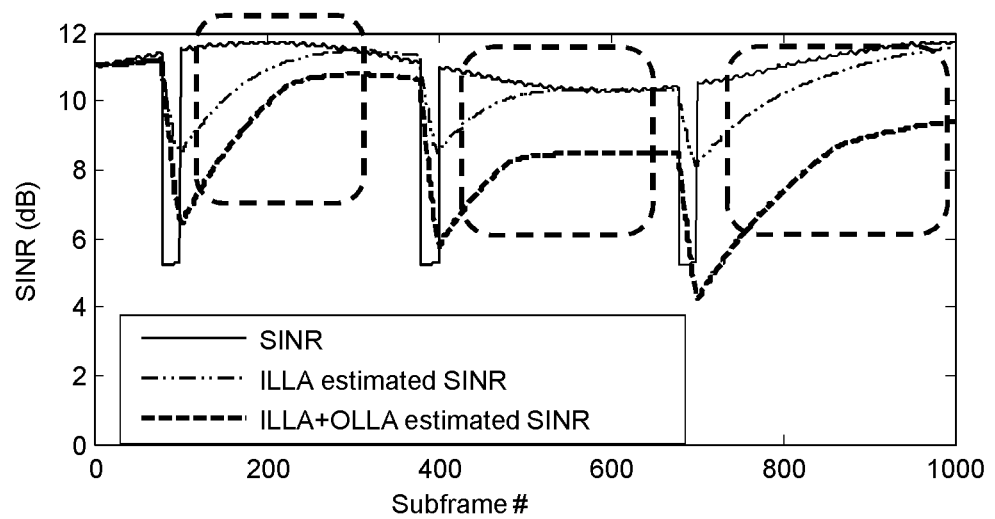
FIG. 2 is a schematic block diagram illustrating embodiments of a wireless communications network.

FIG. 2 shows the estimation of SINR according to legacy methods of Inner Loop Link Adaption (ILLA) and Outer Loop Link Adaption (OLLA). In traditional LA, even when ignoring interference flash light effects caused by neighboring cells, there is a constant bias for outer loop LA to converge towards the actual SINR as depicted with the solid line in FIG. 2. Based on measurements in network, real traffic volume burst characteristics will make the confidence range of BLER measurement too large to achieve a satisfying convergence speed.

When neighboring cell flash light effect is considered, this problem becomes even more serious. Different neighboring cell scheduling will cause the channel quality, such as e.g. SINR, to jump up and down very quickly as can be seen in FIG. 2 at subframe number 100, 400 and 700. This kind of changing channel quality, such as e.g. SINR, is very hard to trace.

The ILLA tries to average the SINR together with an Incremental Redundancy (IR) filter which leads the ILLA estimated SINR to deviate from the actual SINR value after each jump in SINR value. As can further be seen the ILLA estimated SINR converges towards the actual SINR after a number of retransmissions and then deviates again after the next periodic jump in SINR.

When taking OLLA compensation into account the problem increases. Since OLLA has a relative long rise time, the periodic jump in SINR will make OLLA tired and exhausted from running about on missions. Thus the estimation error for OLLA increases with every periodic jump in SINR. Since LA cannot predict the jumps in SINR, OLLA has no choice but to find the offset which guarantees 10% BLER over long time. As seen in the figure, this offset combined with the filtered SINR has very little to do with the actual SINR. It is thus obvious from FIG. 2 that performance of tracing the channel quality is poor in traditional LA.

In order to overcome this problem, embodiments herein may change from tracing a time variable, such as e.g. SINR, to estimating a distribution of a random variable.

Figure 3A:
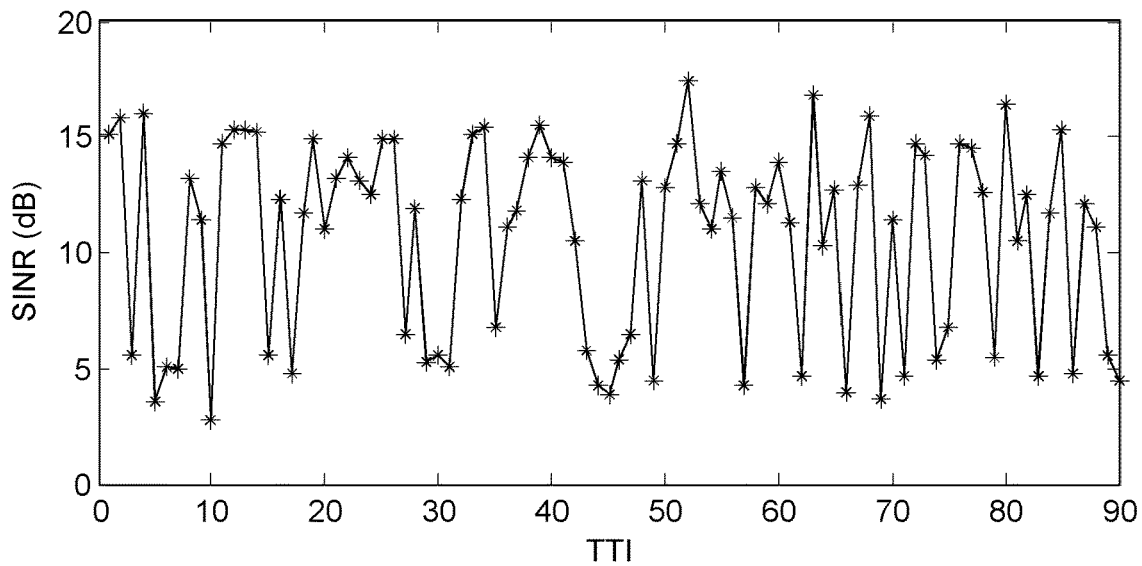
FIG. 3a is a graph illustrating channel quality viewed as a time based variable.
Figure 3B:
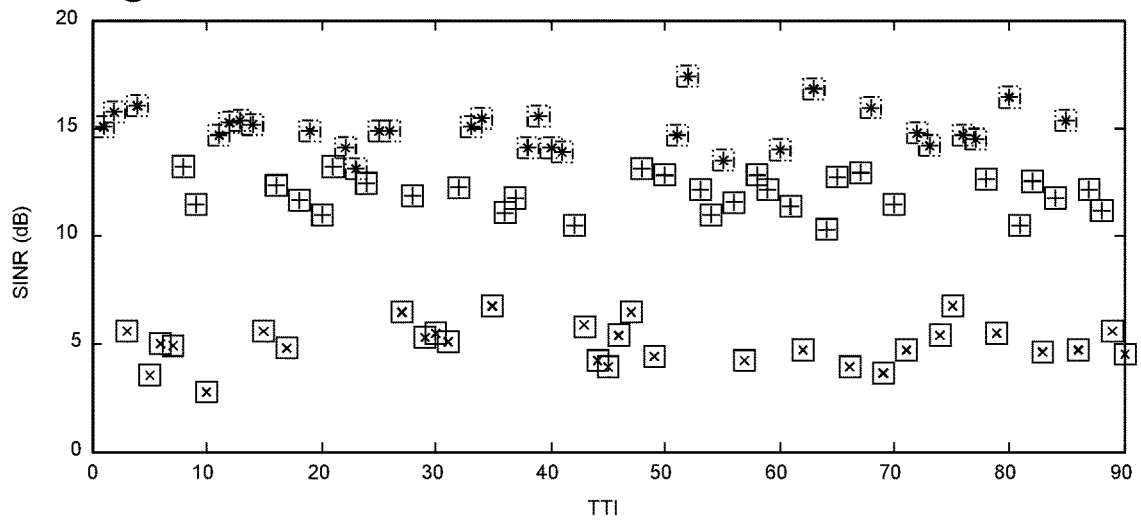
FIG. 3b is a graph illustrating channel quality viewed as a random variable according to embodiments herein.
Figure 3C:
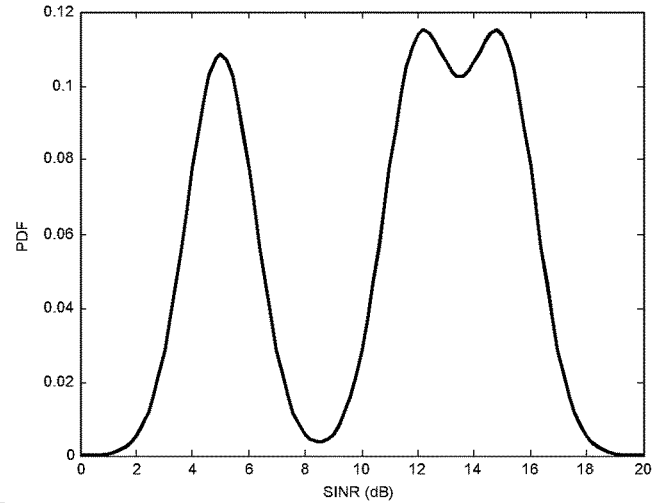
FIG. 3c is a graph illustrating an estimated channel quality distribution according to embodiments herein.

When a channel quality value, such as e.g. a SINR value, is viewed as a time-based variable as is shown in FIG. 3$a$, it will be hard to trace. However, when it is viewed as a random variable, as is shown in FIG. 3$b$, its distribution looks stable. The SINR value distribution can in this scenario be viewed as three clusters, and within each cluster the SINR jitters around its cluster mean. Hence, instead of estimating a channel quality value, such as the SINR value, distribution of the channel quality value is estimated. FIG. 3$c$ shows the estimated distribution for the scenario depicted in FIGS. 3$a$ and 3$b$, As can clearly be seen the SINR values are distributed in three main clusters, namely around 5 dB, 12 dB and 15 dB. When the distribution of the channel quality is known, serial channel quality values with different probability may be used to find the set of transmission parameters which maximizes an expected throughput, instead of using only one channel quality value, such as e.g. the SINR value.

In one embodiment herein, estimating the distribution may be done by estimating parameters for a Gaussian mixture mode model. See section "Assumption and algorithm details" for further details.

In a further embodiment herein, estimating the distribution may be done through the histogram method.

Calculation of transmission parameters for an optimized throughput is based on the distribution of channel quality values. In the following examples the transmission parameters are represented by the MCS and the channel quality is represented by the SINR. However, other transmission parameters and channel quality values may be equally applicable.

When the distribution of the channel quality is known, a MCS which optimizes a target function of LA, such as the throughput (Thp) according to the example below, may be calculated using the following equations 1 and 2. In the following equations the channel quality is represented by the SINR, however other channel qualities may also be used. Equation 1 only considers initial transmission:

$$\text{argmax}_{MCS_{N+1}}\{\text{Thp}\}=\text{argmax}_{MCS_{N+1}}\int_{1st\ SINR} P(\text{SINR})^* (1-\text{BLER}_{1st})^* TB_{size}(MCS_{N+1})d\text{SINR} \quad (1)$$

wherein $\text{argmax}_{MCS_{N+1}}\{\text{Thp}\}$ corresponds to the MCS which optimizes the throughput, $P(\text{SINR})$ is the probability for the SINR value, $(1-\text{BLER}_{1st})$ corresponds to the probability of a successful transmission, and $TB_{size}(MCS_{N+1})$ is the transport block size corresponding to the MCS index $MCS_{N+1}$.

If a maximum of one retransmission is allowed, the MCS which optimizes the target function may be calculated according to equation 2 below:

$$\operatorname{argmax}_{MCS_{N+1}}\{Thp\} = \tag{2}$$

$$\operatorname{argmax}_{MCS_{N+1}} \int_{1st\,SINR} P(SINR) * (1 - BLER_{1st}(MCS_{N+1})) *$$

$$TB_{size}(MCS_{N+1})dSINR +$$

$$\int_{2ndSINR} P(SINR) \frac{BLER_{1st}(MCS_{N+1})(1 - BLER_{2nd}(MCS_{N+1}))}{2} *$$

$$TB_{size}(MCS_{N+1})dSINR$$

in which the index 1st corresponds to the first transmission and the index 2nd corresponds to the retransmission.

It shall be noted that the equation may be extended in the same manner if more than two retransmission are to be allowed.

Assumption and Algorithm Details

The distribution of the channel quality values, such as e.g. the SINR, may be assumed to follow the Gauss mixture model, i.e. mixture of K Gaussian distribution, and each Gaussian may be referred to as a component:

$$P(SINR) = \Sigma_j P_j N(\mu_j, \sigma_j^2) \tag{3}$$

wherein $P_j$ is a parameter of probability of observation associated with a component j, N is the number of observations, $\mu_j$ is the mean of component j and $\sigma_j^2$ is the variance of component j.

The main task is to estimate each component's possibility, and parameters for each component such as e.g. expectation or variance.

The channel quality, such as the SINR in this example, of a scheduled Physical Resource Block (PRB) is a random value X, and there may already be several observations of channel quality, such as the SINR, in previous subframes, $X_i$, i=1, ..., N. Herein $X_1$ means an observation in the last subframe, while $X_n$ means an observation in n subframes before.

Neighbor cells may generate C types, which may also be referred to as components, of interference.

Each components Gauss distribution's possibility is $P(\omega_j)$, j=1, ..., C, wherein $P(\omega_j)$ means that the estimation belongs to component j's possibility, $X \in j$.

For each component, the channel fading follows a Gauss distribution, i.e. $P(\omega_j)N(\mu_j,\sigma_j^2)$. For simplicity, a design parameter $\theta_j(\mu_j,\sigma_j^2)$ may be introduced herein. The parameters $\theta_1$ and $P(\omega_j)$ with observation of $X_i$, may be found by max likelihood estimation:

$$\operatorname*{argmax}_{\hat{\theta}_J, \hat{P}(\omega_j)} \prod_{i=1}^{N} W_i p(X_i \mid \hat{\theta}_J, \hat{P}(\omega_j)),$$

where $W_i$ is a function of i, which is the weight of different observations, due to channel aging, more care will be taken about a likelihood of the last observation than an observation N subframes ago. In other words, Wi may be used to weigh in more recent observations over past ones.

For ease of calculation, the algorithm may be transformed into log domain:

$$\operatorname*{argmax}_{\hat{\theta}_J, \hat{P}(\omega_j)} \sum_{i=1}^{N} \ln(W_i p(X_i \mid \hat{\theta}_J, \hat{P}(\omega_j))),$$

By taking the constraint into consideration that the sum of all probabilities is one, i.e. there is a constraint $\Sigma P(\omega_j)=1$ with Lagrange function, $H = \Sigma_{i=1}^{N} \ln(W_i P(X_i|\theta_j, P(\omega_j))) + \lambda [\Sigma P(\omega_j)-1]$ $$\frac{\partial H}{\partial P(\omega_j)} = 0 \Rightarrow \hat{P}(\omega_j) = \frac{1}{N} \sum_{i=1}^{N} W_i P(\omega_j \mid X_i, \hat{\theta}_J) \tag{4}$$

$$\frac{\partial H}{\partial \theta} = 0 \Rightarrow \mu_j = \frac{\sum_{i=1}^{N} W_i \hat{P}(\omega_i \mid X_i, \hat{\theta}_J) X_i}{\sum_{i=1}^{N} \hat{P}(\omega_i \mid X_i, \hat{\theta}_J)} \tag{5}$$

$$\sigma_j^2 = \frac{\sum_{i=1}^{N} W_i \hat{P}(\omega_i \mid X_i, \hat{\theta}_J)(X_i - \hat{\mu}_J)^2}{\sum_{i=1}^{N} \hat{P}(\omega_i \mid X_i, \hat{\theta}_J)} \tag{6}$$

Algorithm Simplification Using the Histogram Method

It may be hard to implement the above algorithm, so the algorithm may be simplified as follows:

Ignore frequency relation, i.e. $W_i$ is only related with time gap between observation and estimation. i.e. i.

Ignore fading of interference, i.e. view $\sigma_j^2=0$.

Each different SINR observation will be viewed as a separate component distribution, with Wi simplified as a forgetting factor based IR function.

$W_j=\alpha^i$, $0<\alpha \le 1$, $\alpha$ is constant, which is related with channel fading/coherent time, a flat channel will introduce larger $\alpha$.

In this case, if $|X_i-\mu_j| \le \xi$, where $\xi$ is a quantization error, then this observation $X_i \in j$ and $$\hat{P}(\omega_j) = \frac{1}{N} \sum_{i=1}^{N} W_i P(\omega_j \mid X_i, \hat{\theta}_J) = \frac{1}{N} \sum_{i, X_i \in j} W_i \tag{7}$$

After that each different SINR which satisfies $\xi$ quantization error will be viewed as a separate component and its probability $\hat{P}(\omega_1)$ only related to $W_i$. Then $\hat{P}(\omega_1)$ may be used in equation (2) to obtain a MCS which optimizes a target function, such as e.g. an optimized throughput.

Figure 4:
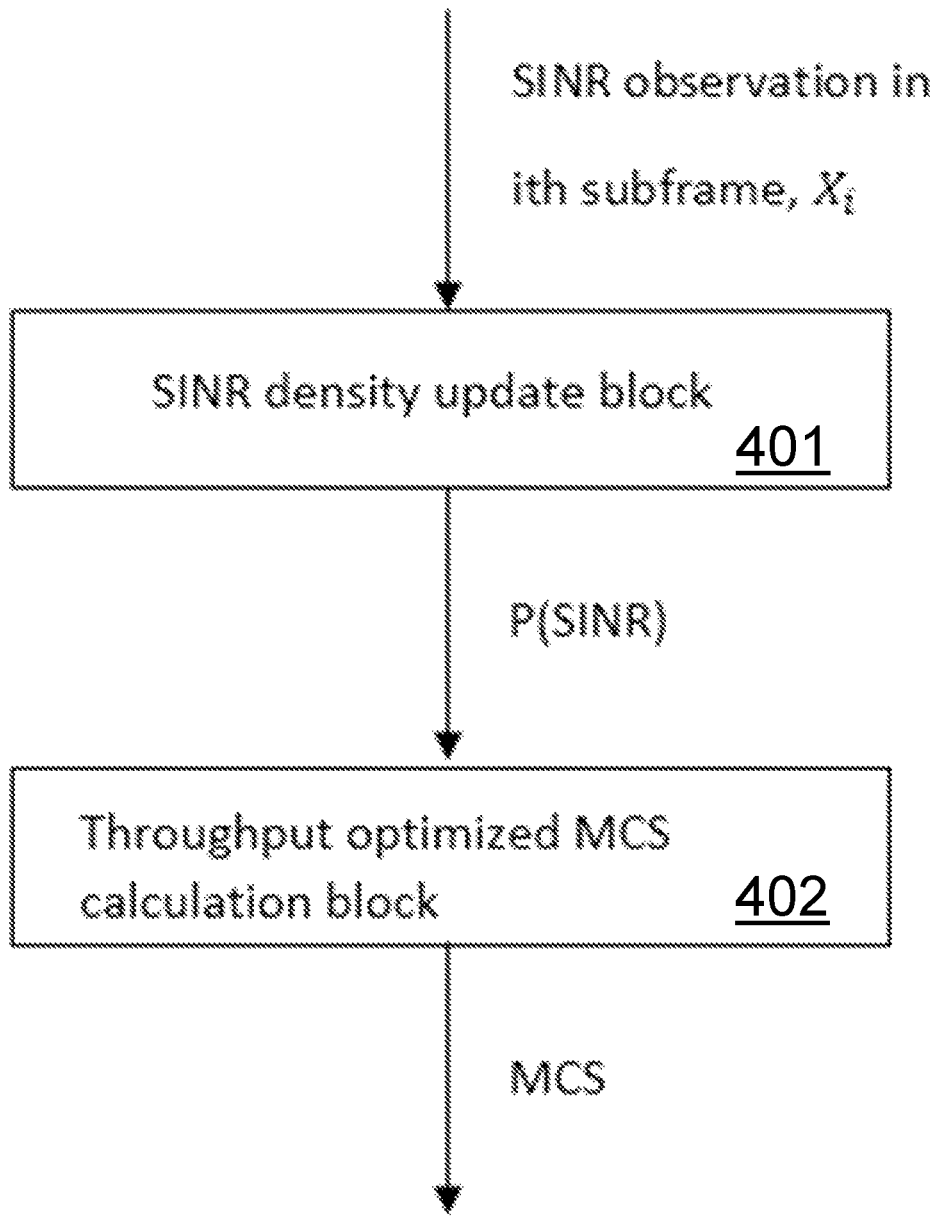
FIG. 4 is a flowchart illustrating a method according to some embodiments herein.

FIG. 4 discloses a block diagram according to some embodiments herein. An Unsupervised Density Estimation based Link Adaption (UDELA) device, which may e.g. be comprised in the network node 110 or in a distributed node, may be separated into two blocks. Once a SINR value is observed it is forwarded to a SINR density update block 401 which updates the probability P(SINR) of the SINR value. The probability P(SINR) may then be forwarded to a throughput optimized MCS calculation block 402 which may use the P(SINR) to determine a MCS value which provides a maximum throughput.

Figure 5:
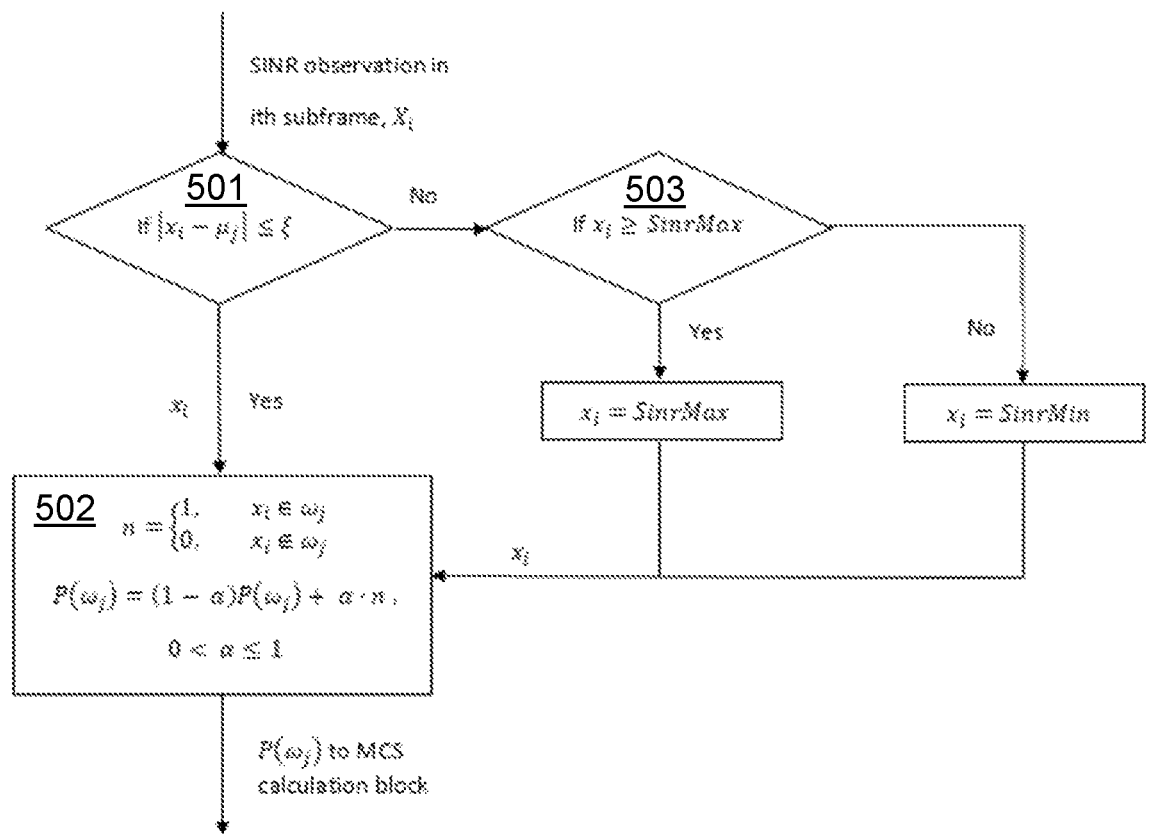
FIG. 5 is a flowchart illustrating a method for performing a density update according to embodiments herein.

FIG. 5 discloses a SINR density update method performed by a calculation block, such as the SINR density update block 401. This method may be referred to as the histogram method. The SINR density update method, may assume that a SINR observation $x_i$ is received. In action 602 it may be determined if the difference between $x_i$ and $\mu_j$ is less than $\xi$. If it is then $x_i$ belongs to component $\omega_j$. In action 503, under the simplification of $\sigma_j^2=0$, $\mu_j$ can be viewed as a serial quantization SINR values with range (SinrMin, SinrMax) wherein the quantization error is $\xi$. For the $\omega_j$ which $x_i$ belongs to, the probability is updated in action 502 as:

$$P(\omega_j)=(1-\alpha)P(\omega_j)+\alpha \cdot n, 0<\alpha \leq 1, n=1,$$

for other $\omega_j$ which $x_i$ does not belong to n is set to 0.

Figure 6:
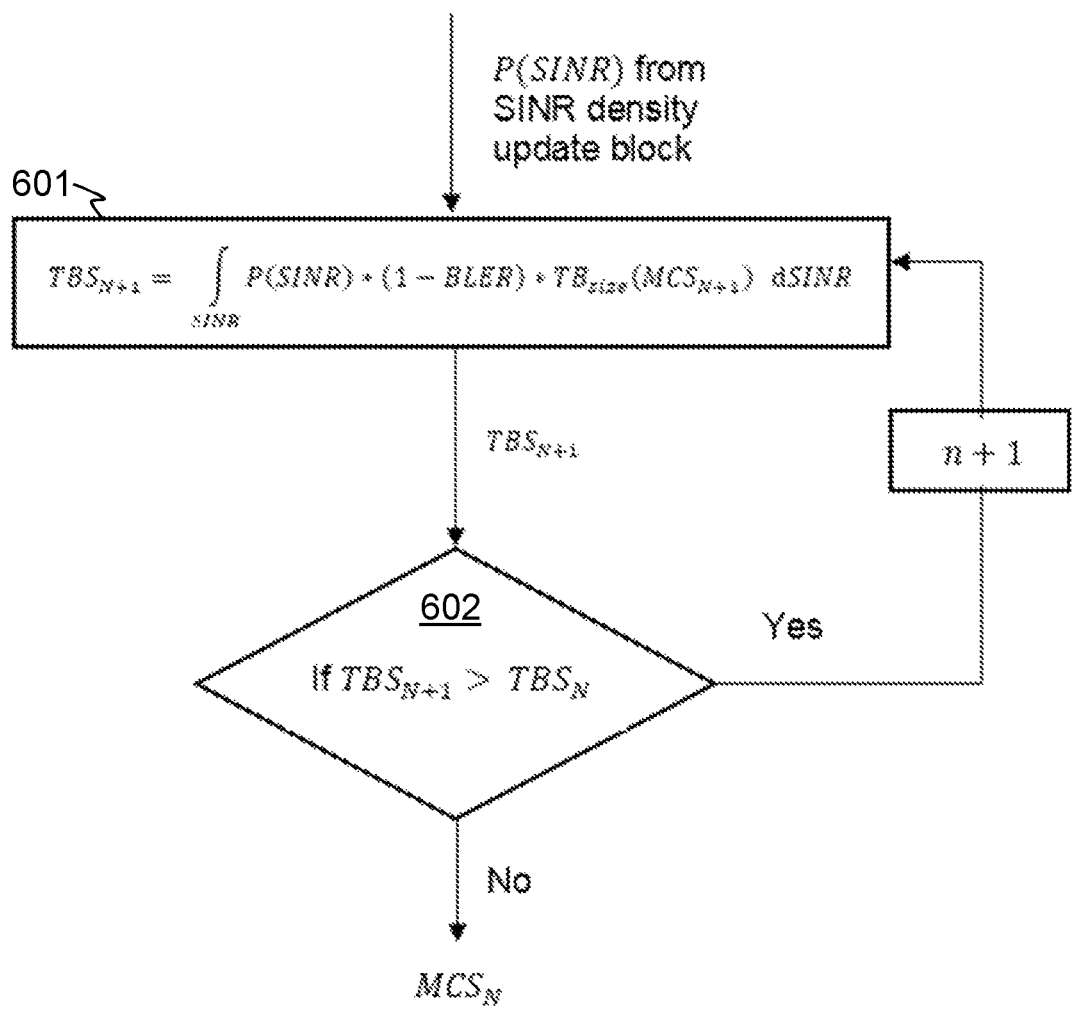
FIG. 6 is a flowchart illustrating a method for determining a set of transmission parameters according to embodiments herein.

FIG. 6 discloses the calculations made by the throughput optimized MCS calculation block 402. In this example only the #1 transmission is considered. The FIG. 6 discloses a method for calculating the transmission parameters, in this case the MCS calculation methods, once P(SINR) has been updated in the SINR density update block 401. In action 601 the following equation may be used to determine TBS $$TBS_{N+1} = \int_{SINR} P(\text{SINR}) * (1 - BLER) * TB_{size}(MCS_{N+1}) d\text{SINR}$$

In action 602, if the latest calculated $TBS_{N+1}$ is larger than the previous one $TBS_N$, the next transmission parameter, such as the MCS in this example, is selected and the calculations are performed for the new transmission parameter. By iterating the calculations for each transmission parameter, such as each MCS, the transmission parameter can be found which maximizes the target function, such as e.g. the TBS size as shown in FIG. 6. The corresponding MCS is then used for the next transmission.

Figure 7:
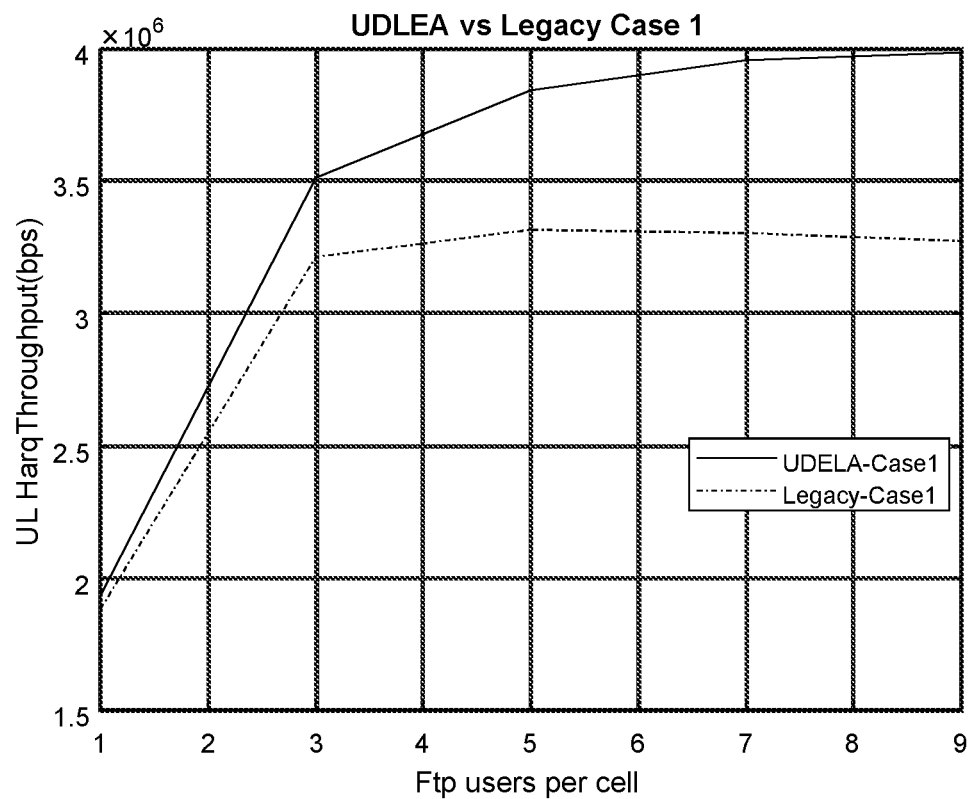
FIG. 7 is a graph illustrating the performance gain of embodiments herein.

FIG. 7 shows a performance comparison between the LA performed according to the embodiments herein, herein also referred to as UDELA, and legacy LA. As can be clearly seen from FIG. 7, the UDELA provides an increased Uplink (UL) throughput independent of the number of users in the cell. However, when the number of users in the cell increases there is a noticeable performance gain for the UDELA method. From a number of 3 and upwards in the cell the throughput for the legacy LA is almost steady at around 3.25 Mbps, while the throughput for the UDELA method continues to increase with the number of users up to a throughput of 4 Mbps when there are 9 users in the cell.

Figure 8:
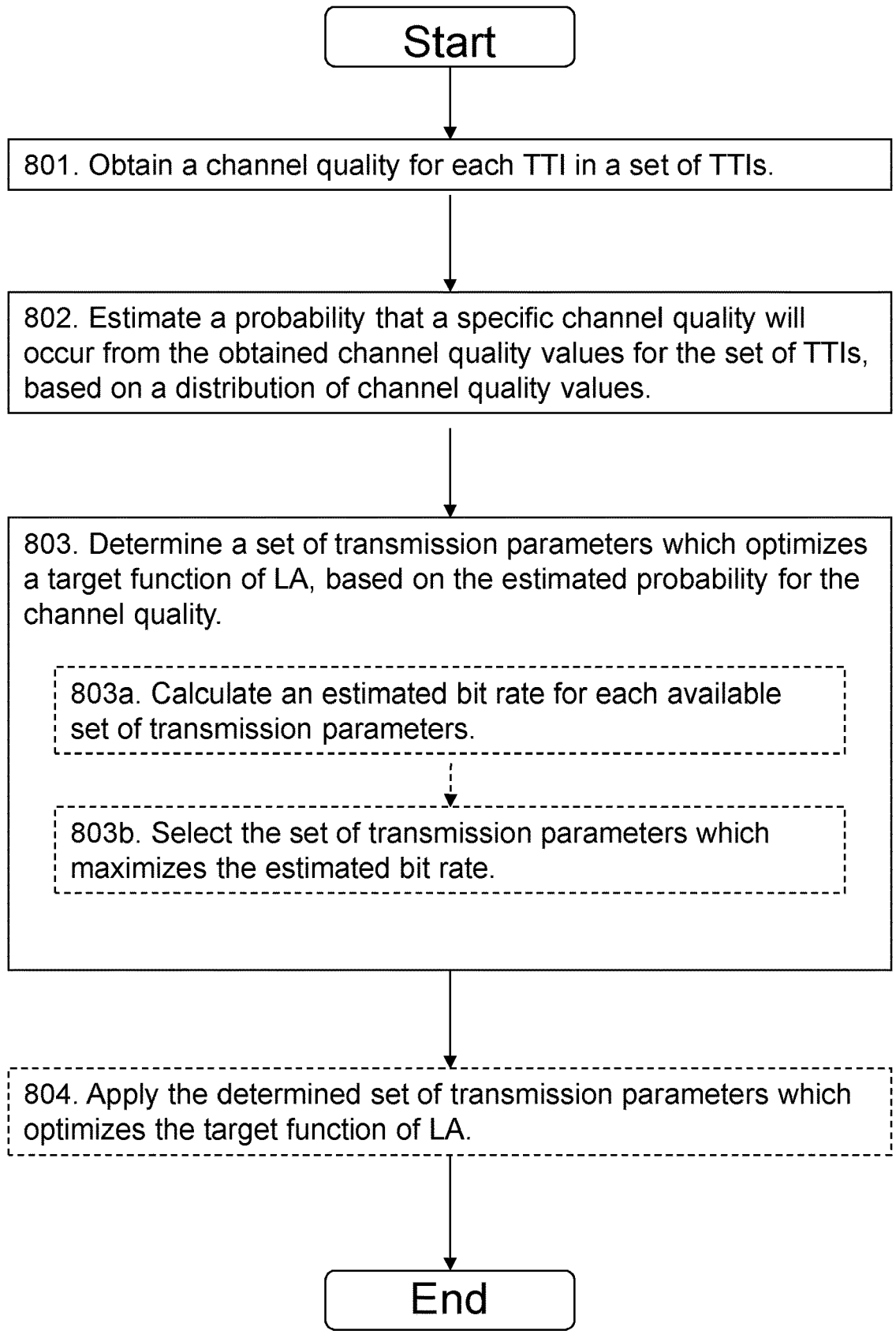
FIG. 8 is a flowchart illustrating a method performed by a network node according to embodiments herein.

FIG. 8 illustrates the method steps for handling LA according to embodiments herein, seen from a perspective of the network node 110.

Action 801: The network node 110 obtains a channel quality value for each TTI in a set of TTIs. The channel quality may be obtained by receiving channel quality measurements from the UE 120. The channel quality may e.g. be a Signal-to-Interference-plus-Noise Ratio (SINR) a Gain to Interference plus Noise Ratio (GINR) or a received bit information.

Action 802: The network node 110 estimates a probability that a specific channel quality will occur from the obtained channel quality values for the set of TTIs based on a distribution of the channel quality values.

The probability may be estimated by means of a probability distribution estimation, such as e.g. model fitting, of the obtained channel quality values. The probability distribution estimation may e.g. be performed by estimating parameters for a Gaussian mixture mode model.

Based on the estimated probability distribution of the channel quality values, a set of transmission parameters for which required channel quality for successful reception is known may be mapped to a probability of successful reception when applying said set of transmission parameters.

Action 803: The network node 110 determines the set of transmission parameters which optimizes a target function of LA, based on the estimated probability for the channel quality, by mapping the set of transmission parameters to a channel quality which is required for a successful reception.

The set of transmission parameters may be any one of a Modulation and Coding Scheme, MCS, a transmission power, a modulation scheme, a coding rate, a bandwidth and a transmission time.

The target function may be any one of a maximum throughput, a desired level of robustness, a desired probability of errors, and a minimized packet latency.

In some embodiments the target function may be a maximum throughput and the network node 110 may determine the set of transmission parameters which optimizes the target function of LA by performing the following optional actions 703a and 703b.

Action 803a: The network node 110 may calculate an estimated bit rate for each available set of transmission parameters, wherein the estimated bit rate (BRX_est) for each available set X=0, 1, . . . , n of transmission parameters is the sum of the products of the rate of successfully transmitted blocks for the set of transmission parameters for each channel quality value, the probability for each channel quality value and a Transport Block Size (TBS) corresponding to each set of transmission parameters, i.e. corresponding to the index of each set of transmission parameters.

TABLE 1

| MCS index with corresponding TBS index | | |
|---|---|---|
| MCS Index | Modulation | TBS Index |
| 0 | QPSK | 0 |
| 1 | | 1 |
| 2 | | 2 |
| 3 | | 3 |
| 4 | | 4 |
| 5 | | 5 |
| 6 | | 6 |
| 7 | | 7 |
| 8 | | 8 |
| 9 | | 9 |
| 10 | 16QAM | 10 |
| 11 | | 10 |
| 12 | | 11 |
| 13 | | 12 |
| 14 | | 13 |
| 15 | | 14 |
| 16 | | 15 |
| 17 | 64QAM | 15 |
| 18 | | 16 |
| 19 | | 17 |
| 20 | | 18 |
| 21 | | 19 |
| 22 | | 20 |
| 23 | | 21 |
| 24 | | 22 |
| 25 | | 23 |
| 26 | | 24 |

TABLE 1-continued

MCS index with corresponding TBS index

| MCS Index | Modulation | TBS Index |
|---|---|---|
| 27 |  | 25 |
| 28 |  | 26 |
| 29 | QPSK | Reserved |
| 30 | 16QAM |  |
| 31 | 64QAM |  |

The network node 110 obtains channel quality, which in this specific example is represented by SINR, statistics results from measurements (0 to 20 dB) and determines the probability for each received SINR value:

| SINR value: | 0 | 1 | 2 | . . . | 20 db |
|---|---|---|---|---|---|
| Probability: | 1% | 2% | 3% | . . . | 5% |

For each available set of transmission parameters, in this case exemplified by the Modulation and Coding Schemes MCS0-MCS28, the estimated bit rate is calculated by determining an estimated bit rate based on each SINR value, the corresponding probability based on the rate of successfully transmitted bits and the Transport Block Size (TBS) corresponding to the MCS as shown in table 1. The rate of successfully transmitted bits is determined based on the Block Error Rate (BLER) as 1−BLER (transmission parameters, channel quality).

For the first set of transmission parameters MCS0, the bit rate is determined for each:

estiBR0_0 dB=1%*(1−BLER(*mcs*0,0 dB))*TBS0 estiBR0_1 dB=2%*(1−BLER(*mcs*0,1 dB))*TBS0

. . . .

estiBR0_20 dB=5%*(1−BLER(*mcs*0,20 dB))*TBS0

BR0_est=estiBR0_0 dB+estiBR0_1 dB+ . . . +estiBR0_20 dB

For MCS1:
Similar progress to calculate BR1_est
. . . .
For MCS28
Similar progress to calculate BR28_est Action 803*b*: The network node 110 may further select the set of transmission parameters 1, . . . , X which maximizes the estimated bit rate. With reference to the example embodiment disclosed above under Action 803*a* this may be done by finding the MCS level which has the maximum BR_est, and using this MCS level as the MCS for LA.

Action 804: The network node 110 may further apply the determined set of transmission parameters which optimizes the target function of LA. This may also be referred to as performing LA using the determined set of transmission parameters.

Figure 9:
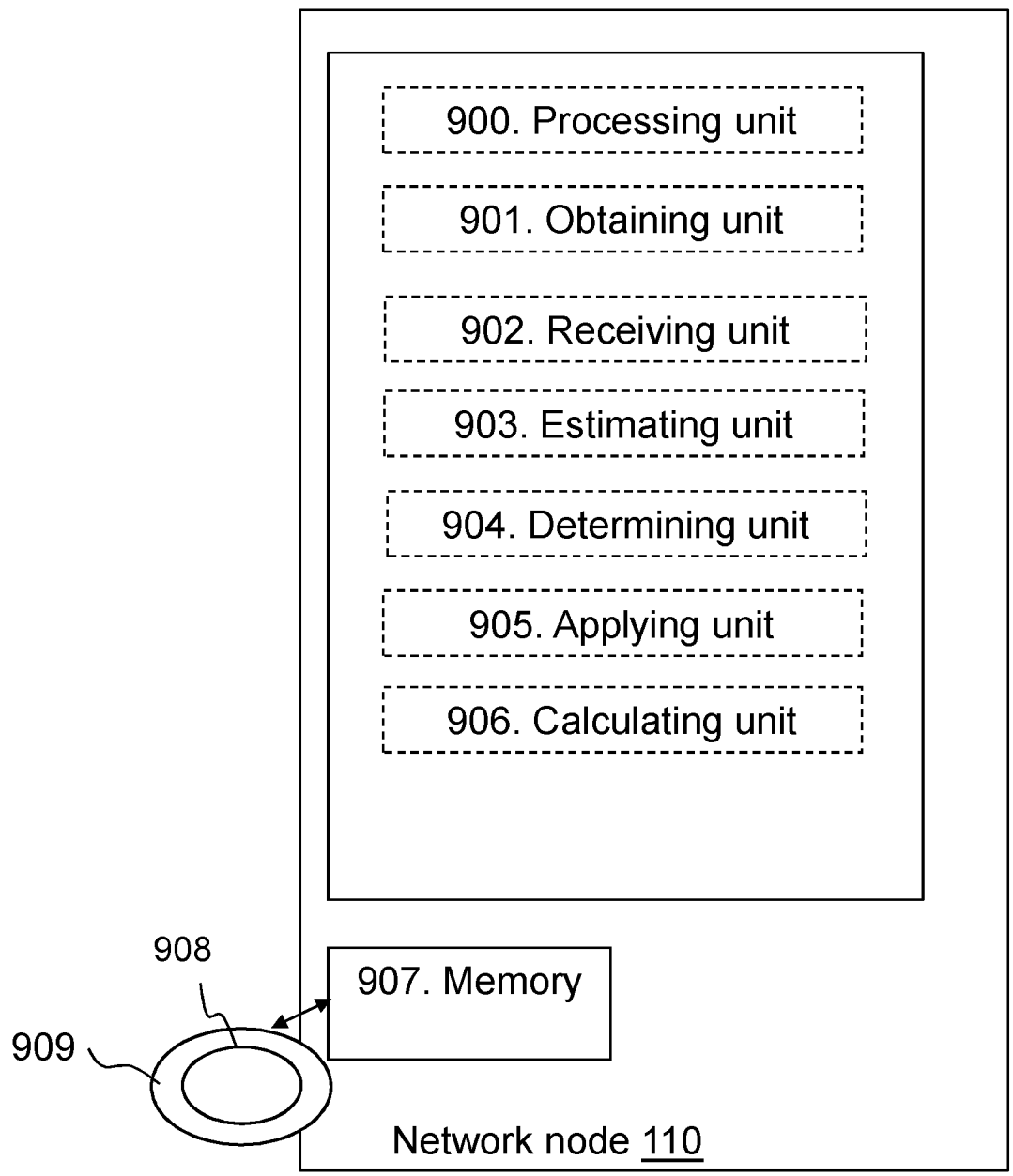
FIG. 9 is a schematic block diagram illustrating some first embodiments of a network node.

FIG. 9 is a block diagram depicting the network node 110, for performing a method for handling link adaption (LA) of a channel. The network node 110 may comprise a processing unit 900, such as e.g. one or more processors, an obtaining unit 901, a receiving unit 902, an estimating unit 903, a determining unit 904, an applying unit 905 and/or a calculating unit 906 as exemplifying hardware units configured to perform the method as described herein.

The network node 110 is configured to, e.g. by means of the processing unit 901 and/or the obtaining unit 902 being configured to, obtain the channel quality value for each TTI in the set of TTIs.

The network node 110 is configured to, e.g. by means of the processing unit 901 and/or the estimating unit 903 being configured to, estimate the probability that a specific channel quality will occur from the obtained channel quality values for the set of TTIs based on the distribution of channel quality values.

The network node 110 is configured to, e.g. by means of the processing unit 901 and/or the determining unit 904 being configured to, determine the set of transmission parameters which optimizes the target function of LA, based on the estimated probability for the channel quality, wherein each set of transmission parameters is mapped to the channel quality which is required for a successful reception.

The network node 110 may be configured to, e.g. by means of the processing unit 901 and/or the estimating unit 903 being configured to, estimate the probability by means of a probability distribution estimation of the received channel quality values.

The network node 110 may be configured to, e.g. by means of the processing unit 901 and/or the estimating unit 903 being configured to, perform the probability distribution estimation by estimating parameters for a Gaussian mixture mode model.

The network node 110 may be configured to, e.g. by means of the processing unit 901 and/or the determining unit 904 being configured to, map the set of transmission parameters, for which required channel quality for successful reception is known, to the probability of successful reception when applying said set of transmission parameters, based on the estimated probability distribution of the channel quality values.

The network node 110 may be configured to, e.g. by means of the processing unit 901 and/or the applying unit 905 being configured to, apply the determined set of transmission parameters which optimizes the target function of LA.

The network node 110 may be configured to, e.g. by means of the processing unit 901 and/or the obtaining unit 901 and/or the receiving unit 902 being configured to, obtain the channel quality by receiving channel quality measurements from the UE 120.

In some embodiments where the target function is a maximum throughput, the network node 110 may be configured to determine the set of transmission parameters which optimizes the target function of LA by being configured to calculate, e.g. by means of the processing unit 900 and/or the determining unit 904 and/or the calculating unit 906 being configured to calculate, an estimated bit rate for each available set of transmissions parameters. The network node 110 may be configured to calculate, e.g. by means of the processing unit 900 and/or the determining unit 904 and/or the calculating unit 906 being configured to calculate, the estimated bit rate for each available set of transmission parameters as the sum of the products of the rate of successfully transmitted blocks for the set of transmission parameters for each channel quality value, the probability for each channel quality value and a Transport Block Size, TBS, corresponding to each set of transmission parameters. The network node 110 may further be configured to select, e.g. by means of the processing unit 901 and/or the determining unit 904 and/or the selecting unit 906 being configured to select, the set of transmission parameters which maximizes the estimated bit rate.

Figure 10:
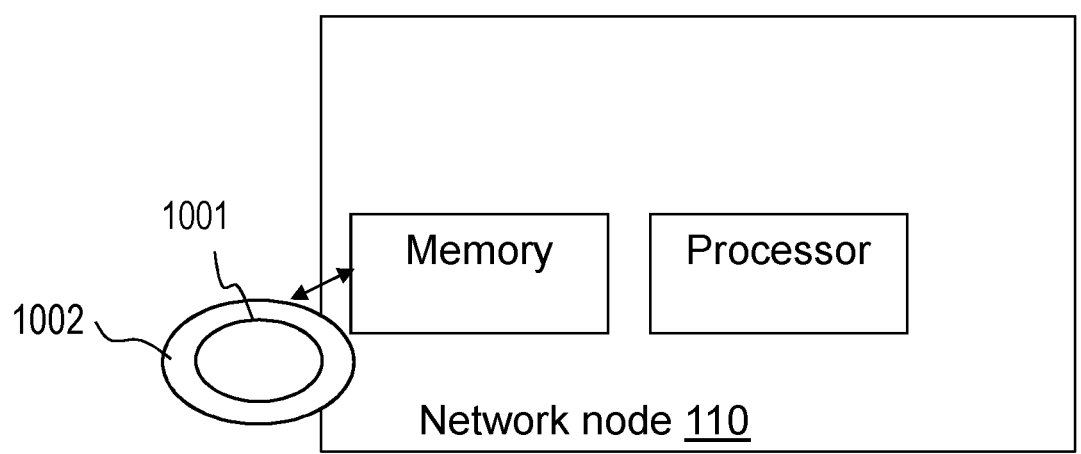
FIG. 10 is a schematic block diagram illustrating some second embodiments of a network node.

The embodiments herein may be implemented through a respective processor or one or more processors of a processing circuitry in the network node 110 as depicted in FIG. 10, which processing circuitry is configured to perform the method actions according to FIG. 8 and the embodiments described above for the network node 110. The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory. The memory may comprise one or more memory units to be used to store data on, such as software, patches, system information, configurations, diagnostic data, performance data and/or applications to perform the methods disclosed herein when being executed, and similar.

The method according to the embodiments described herein for the network node 110 may be implemented by means of e.g. a computer program 908, 1001 or a computer program product, comprising instructions, i.e., software code portions, which, when executed on at least one processor, cause at least one processor to carry out the actions described herein, as performed by the network node 110. The computer program 1001 may be stored on a computer-readable storage medium 909, 1002, e.g. a disc or similar. The computer-readable storage medium 909, 1002, having stored thereon the computer program, may comprise instructions which, when executed on at least one processor, cause the at least one processor to carry out the actions described herein, as performed by the network node 110. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

The network node 110 described in the embodiments herein may also be implemented in a cloud. Although the method actions performed by the network node 110 herein are discussed in the context of a radio access node, the method may also be performed by a core network node or a distributed node comprised in a first cloud, such as e.g. a server and/or a datacenter. The method actions may e.g. be performed by a logical function, which may be a centralized service hosted on the core network node or the distributed node.

Further Extensions and Variations

Figure 11:
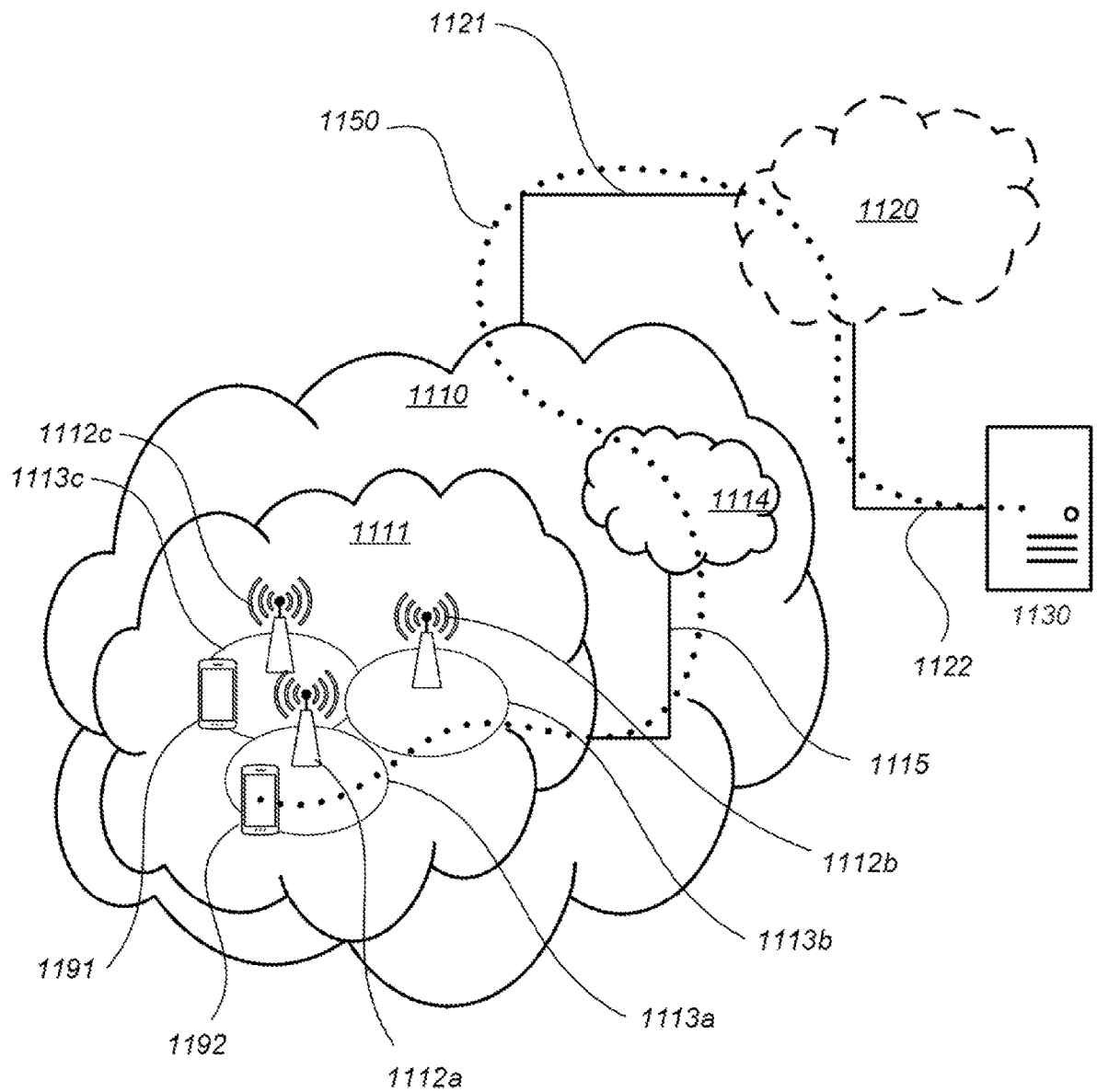
FIG. 11 is a schematic overview of a telecommunication network connected via an intermediate network to a host computer in accordance with some embodiments.

With reference to FIG. 11, in accordance with an embodiment, a communication system includes a telecommunication network 1110 such as the wireless communications network 100, e.g. a WLAN, such as a 3GPP-type cellular network, which comprises an access network 1111, such as a radio access network, and a core network 1114. The access network 1111 comprises a plurality of base stations 1112a, 1112b, 1112c, such as e.g. the network node 110, access nodes, AP STAs NBs, eNBs, gNBs or other types of wireless access points, each defining a corresponding coverage area 1113a, 1113b, 1113c. Each base station 1112a, 1112b, 1112c is connectable to the core network 1114 over a wired or wireless connection 1115. A first user equipment (UE) such as a Non-AP STA 1191 located in coverage area 1113c is configured to wirelessly connect to, or be paged by, the corresponding base station 1112c. A second UE 1192 such as a Non-AP STA in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

The telecommunication network 1110 is itself connected to a host computer 1130, which may be embodied in the hardware and/or software of a standalone server, a cloud-implemented server, a distributed server or as processing resources in a server farm. The host computer 1130 may be under the ownership or control of a service provider, or may be operated by the service provider or on behalf of the service provider. The connections 1121, 1122 between the telecommunication network 1110 and the host computer 1130 may extend directly from the core network 1114 to the host computer 1130 or may go via an optional intermediate network 1120. The intermediate network 1120 may be one of, or a combination of more than one of, a public, private or hosted network; the intermediate network 1120, if any, may be a backbone network or the Internet; in particular, the intermediate network 1120 may comprise two or more sub-networks (not shown).

The communication system of FIG. 11 as a whole enables connectivity between one of the connected UEs 1191, 1192 and the host computer 1130. The connectivity may be described as an over-the-top (OTT) connection 1150. The host computer 1130 and the connected UEs 1191, 1192 are configured to communicate data and/or signaling via the OTT connection 1150, using the access network 1111, the core network 1114, any intermediate network 1120 and possible further infrastructure (not shown) as intermediaries. The OTT connection 1150 may be transparent in the sense that the participating communication devices through which the OTT connection 1150 passes are unaware of routing of uplink and downlink communications. For example, a base station 1112 may not or need not be informed about the past routing of an incoming downlink communication with data originating from a host computer 1130 to be forwarded (e.g., handed over) to a connected UE 1191. Similarly, the base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In a communication system 1200, a host computer 1210 comprises hardware 1215 including a communication interface 1216 configured to set up and maintain a wired or wireless connection with an interface of a different communication device of the communication system 1200. The host computer 1210 further comprises processing circuitry 1218, which may have storage and/or processing capabilities. In particular, the processing circuitry 1218 may comprise one or more programmable processors, application-specific integrated circuits, field programmable gate arrays or combinations of these (not shown) adapted to execute instructions. The host computer 1210 further comprises software 1211, which is stored in or accessible by the host computer 1210 and executable by the processing circuitry 1218. The software 1211 includes a host application 1212. The host application 1212 may be operable to provide a service to a remote user, such as a UE 1230 connecting via an OTT connection 1250 terminating at the UE 1230 and the host computer 1210. In providing the service to the remote user, the host application 1212 may provide user data which is transmitted using the OTT connection 1250.

The communication system 1200 further includes a base station 1220 provided in a telecommunication system and comprising hardware 1225 enabling it to communicate with the host computer 1210 and with the UE 1230. The hardware 1225 may include a communication interface 1226 for setting up and maintaining a wired or wireless connection with an interface of a different communication device of the communication system 1200, as well as a radio interface 1227 for setting up and maintaining at least a wireless connection 1270 with a UE 1230 located in a coverage area (not shown in FIG. 12) served by the base station 1220. The communication interface 1226 may be configured to facilitate a connection 1260 to the host computer 1210. The connection 1260 may be direct or it may pass through a core network (not shown in FIG. 12) of the telecommunication system and/or through one or more intermediate networks outside the telecommunication system. In the embodiment shown, the hardware 1225 of the base station 1220 further includes processing circuitry 1228, which may comprise one or more programmable processors, application-specific integrated circuits, field programmable gate arrays or combinations of these (not shown) adapted to execute instructions. The base station 1220 further has software 1221 stored internally or accessible via an external connection.

The communication system 1200 further includes the UE 1230 already referred to. Its hardware 1235 may include a radio interface 1237 configured to set up and maintain a wireless connection 1270 with a base station serving a coverage area in which the UE 1230 is currently located. The hardware 1235 of the UE 1230 further includes processing circuitry 1238, which may comprise one or more programmable processors, application-specific integrated circuits, field programmable gate arrays or combinations of these (not shown) adapted to execute instructions. The UE 1230 further comprises software 1231, which is stored in or accessible by the UE 1230 and executable by the processing circuitry 1238. The software 1231 includes a client application 1232. The client application 1232 may be operable to provide a service to a human or non-human user via the UE 1230, with the support of the host computer 1210. In the host computer 1210, an executing host application 1212 may communicate with the executing client application 1232 via the OTT connection 1250 terminating at the UE 1230 and the host computer 1210. In providing the service to the user, the client application 1232 may receive request data from the host application 1212 and provide user data in response to the request data. The OTT connection 1250 may transfer both the request data and the user data. The client application 1232 may interact with the user to generate the user data that it provides.

Figure 12:
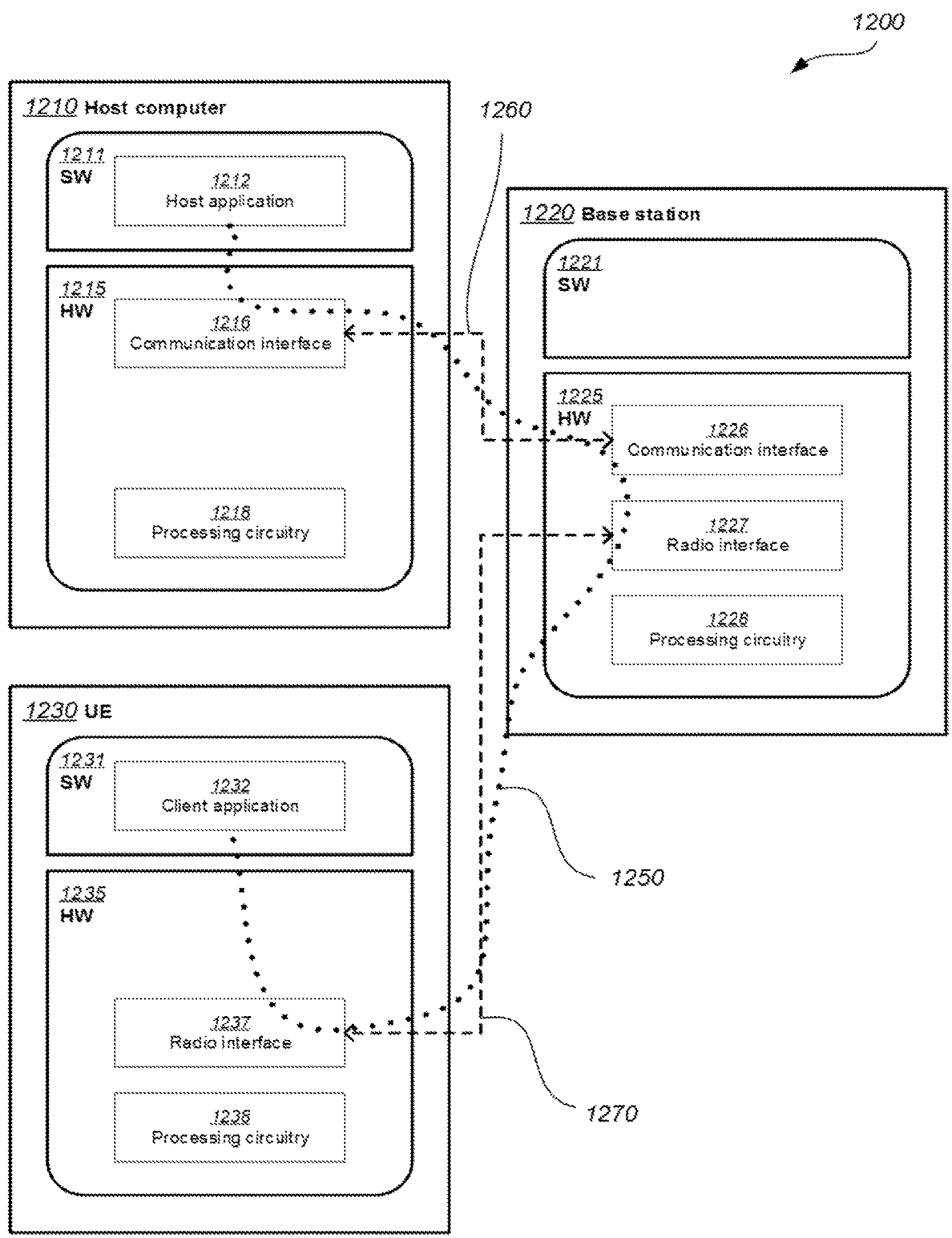
FIG. 12 is a schematic overview of a host computer communicating via a base station with a user equipment over a partially wireless connection in accordance with some embodiments.

It is noted that the host computer 1210, base station 1220 and UE 1230 illustrated in FIG. 12 may be identical to the host computer 1130, one of the base stations 1112a, 1112b, 1112c and one of the UEs 1191, 1192 of FIG. 11, respectively. This is to say, the inner workings of these entities may be as shown in FIG. 12 and independently, the surrounding network topology may be that of FIG. 11.

In FIG. 12, the OTT connection 1250 has been drawn abstractly to illustrate the communication between the host computer 1210 and the user equipment 1230 via the base station 1220, without explicit reference to any intermediary devices and the precise routing of messages via these devices. Network infrastructure may determine the routing, which it may be configured to hide from the UE 1230 or from the service provider operating the host computer 1210, or both. While the OTT connection 1250 is active, the network infrastructure may further take decisions by which it dynamically changes the routing (e.g., on the basis of load balancing consideration or reconfiguration of the network).

The wireless connection 1270 between the UE 1230 and the base station 1220 is in accordance with the teachings of the embodiments described throughout this disclosure. One or more of the various embodiments improve the performance of OTT services provided to the UE 1230 using the OTT connection 1250, in which the wireless connection 1270 forms the last segment. More precisely, the teachings of these embodiments may improve the data rate and latency and thereby provide benefits such as reduced user waiting time, relaxed restriction on file size and better responsiveness.

A measurement procedure may be provided for the purpose of monitoring data rate, latency and other factors on which the one or more embodiments improve. There may further be an optional network functionality for reconfiguring the OTT connection 1250 between the host computer 1210 and UE 1230, in response to variations in the measurement results. The measurement procedure and/or the network functionality for reconfiguring the OTT connection 1250 may be implemented in the software 1211 of the host computer 1210 or in the software 1231 of the UE 1230, or both. In embodiments, sensors (not shown) may be deployed in or in association with communication devices through which the OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of the OTT connection 1250 may include message format, retransmission settings, preferred routing etc.; the reconfiguring need not affect the base station 1220, and it may be unknown or imperceptible to the base station 1220. Such procedures and functionalities may be known and practiced in the art. In certain embodiments, measurements may involve proprietary UE signaling facilitating the host computer's 1210 measurements of throughput, propagation times, latency and the like. The measurements may be implemented in that the software 1211, 1231 causes messages to be transmitted, in particular empty or 'dummy' messages, using the OTT connection 1250 while it monitors propagation times, errors etc.

Figure 13:
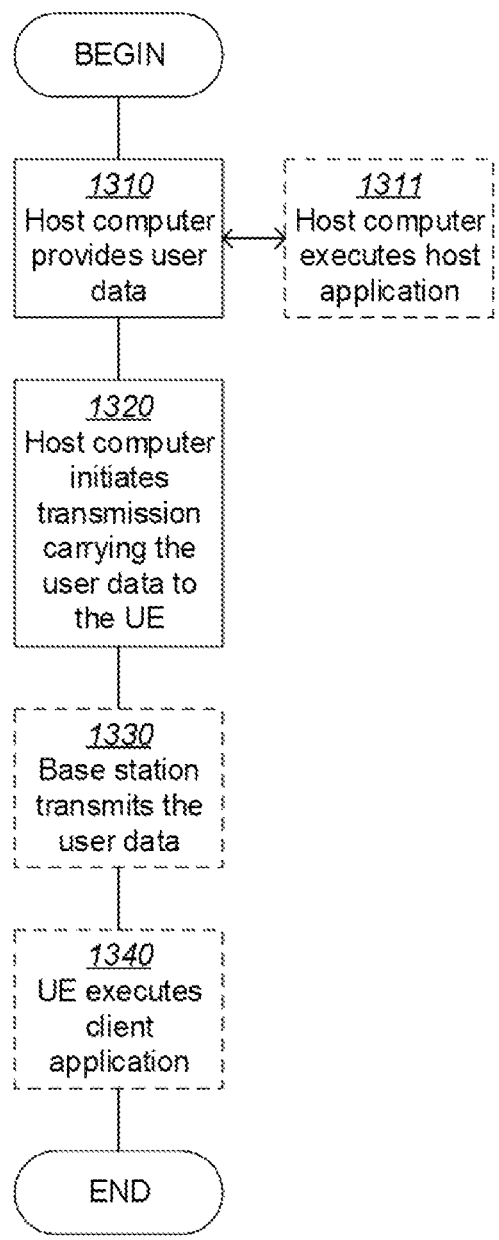
FIG. 13 is a flowchart depicting methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station such as a AP STA, and a UE such as a Non-AP STA which may be those described with reference to FIGS. 11 and 12. For simplicity of the present disclosure, only drawing references to FIG. 13 will be included in this section. In a first action 1310 of the method, the host computer provides user data. In an optional subaction 1311 of the first action 1310, the host computer provides the user data by executing a host application. In a second action 1320, the host computer initiates a transmission carrying the user data to the UE. In an optional third action 1330, the base station transmits to the UE the user data which was carried in the transmission that the host computer initiated, in accordance with the teachings of the embodiments described throughout this disclosure. In an optional fourth action 1340, the UE executes a client application associated with the host application executed by the host computer.

Figure 14:
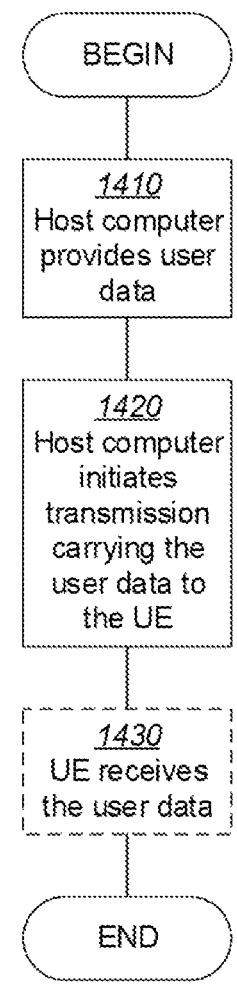
FIG. 14 is a flowchart depicting methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station such as a AP STA, and a UE such as a Non-AP STA which may be those described with reference to FIGS. 11 and 12. For simplicity of the present disclosure, only drawing references to FIG. 14 will be included in this section. In a first action 1410 of the method, the host computer provides user data. In an optional subaction (not shown) the host computer provides the user data by executing a host application. In a second action 1420, the host computer initiates a transmission carrying the user data to the UE. The transmission may pass via the base station, in accordance with the teachings of the embodiments described throughout this disclosure. In an optional third action 1430, the UE receives the user data carried in the transmission.

Figure 15:
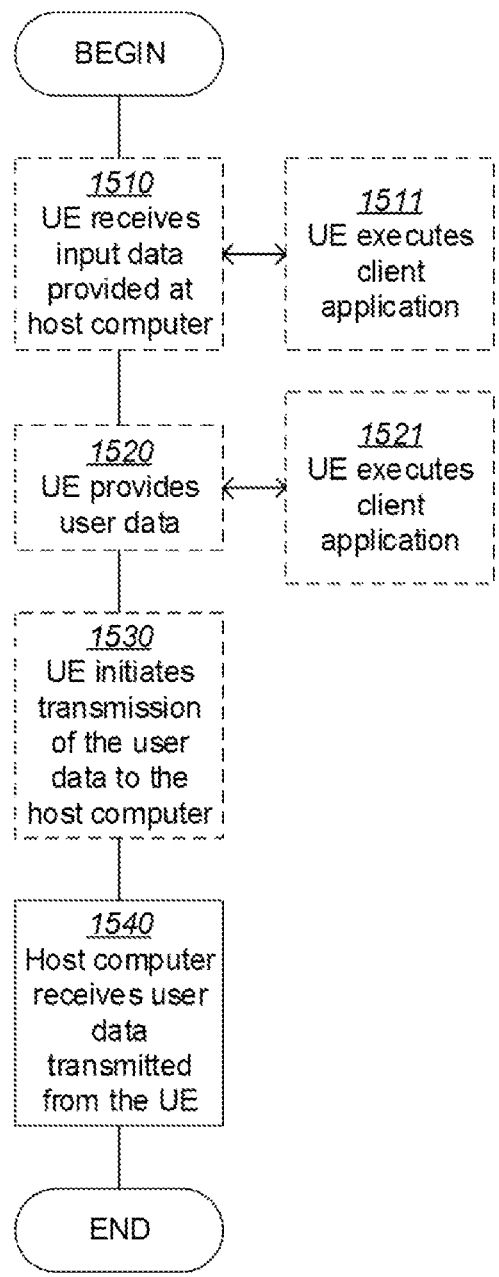
FIG. 15 is a flowchart depicting methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station such as a AP STA, and a UE such as a Non-AP STA which may be those described with reference to FIGS. 11 and 12. For simplicity of the present disclosure, only drawing references to FIG. 15 will be included in this section. In an optional first action 1510 of the method, the UE receives input data provided by the host computer. Additionally or alternatively, in an optional second action 1520, the UE provides user data. In an optional subaction 1521 of the second action 1520, the UE provides the user data by executing a client application. In a further optional subaction 1511 of the first action 1510, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 1530, transmission of the user data to the host computer. In a fourth action 1540 of the method, the host computer receives the user data transmitted from the UE, in accordance with the teachings of the embodiments described throughout this disclosure.

Figure 16:
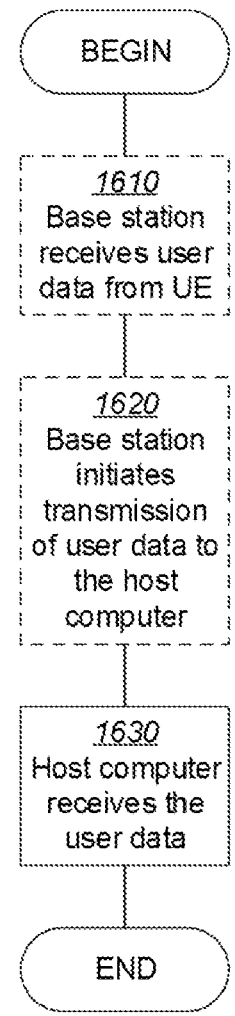
FIG. 16 is a flowchart depicting methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station such as a AP STA, and a UE such as a Non-AP STA which may be those described with reference to FIGS. 11 and 12. For simplicity of the present disclosure, only drawing references to FIG. 16 will be included in this section. In an optional first action 1610 of the method, in accordance with the teachings of the embodiments described throughout this disclosure, the base station receives user data from the UE. In an optional second action 1620, the base station initiates transmission of the received user data to the host computer. In a third action 1630, the host computer receives the user data carried in the transmission initiated by the base station.

When using the word "comprise" or "comprising" it shall be interpreted as non-limiting, i.e. meaning "consist at least of". When using the word "set" herein, it shall be interpreted as meaning "one or more".

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

Definitions

| Abbreviation | Explanation |
| --- | --- |
| UDELA | Unsupervised density estimation based link adaptation |
| LA | Link adaptation |
| SINR | Signal to interference plus noise ratio |
| MCS | Modulation and coding scheme |
| PRB | Physical resource block |
| IR | Infinite impulse response |
| TBS | Transmission block size |

The invention claimed is:

1. A method performed by a network node for handling link adaption (LA) of a channel, the method comprising:
obtaining a channel quality value for each Transmission Time Interval (TTI) in a set of TTIs;
estimating a probability that a specific channel quality will occur from the obtained channel quality values for the set of TTIs based on a distribution of channel quality values, wherein the probability is estimated by a probability distribution estimation of the channel quality values; and
determining a set of transmission parameters which optimizes a target function of LA, based on the estimated probability for the channel quality, wherein the set of transmission parameters for which required channel quality for successful reception is known is mapped to a probability of successful reception when applying the set of transmission parameters, based on the probability distribution estimation of the channel quality values.

2. The method according to claim 1, wherein the probability distribution estimation is performed by estimating parameters for a Gaussian mixture mode model.

3. The method according to claim 1 further comprising:
applying the determined set of transmission parameters which optimizes the target function of LA.

4. The method according to claim 1, wherein the channel quality is obtained by receiving channel quality measurements from a user equipment (UE).

5. The method according to claim 1, wherein the set of transmission parameters is any one of a Modulation and Coding Scheme (MCS), a transmission power, a modulation scheme, a coding rate, a bandwidth and a transmission time.

6. The method according to claim 1, wherein the target function is any one of a maximum throughput, a desired level of robustness, a desired probability of errors, and a minimized packet latency.

7. The method according to claim 1, wherein the target function is a maximum throughput and the set of transmission parameters which optimizes the target function of LA is determined by:
 calculating an estimated bit rate for each available set of transmissions parameters, wherein the estimated bit rate for each available set of transmission parameters is a sum of products of a rate of successfully transmitted blocks for the set of transmission parameters for each channel quality value, the probability for each channel quality value and a Transport Block Size (TBS) corresponding to each set of transmission parameters; and
 selecting the set of transmission parameters which maximizes the estimated bit rate.

8. A network node for performing a handling link adaption (LA) of a channel comprising:
 a processor; and
 a memory containing instructions which, when executed by said processor, cause said network node to:
  obtain a channel quality value for each Transmission Time Interval (TTI) in a set of TTIs;
  estimate a probability that a specific channel quality will occur from the obtained channel quality values for the set of TTIs based on a distribution of channel quality values, wherein the probability is estimated by a probability distribution estimation of the channel quality values; and
  determine a set of transmission parameters which optimizes a target function of LA, based on the estimated probability for the channel quality, wherein the set of transmission parameters for which required channel quality for successful reception is known is mapped to a probability of successful reception when applying the set of transmission parameters, based on the probability distribution estimation of the channel quality values.

9. A non-transitory computer-readable storage medium, having stored thereon a computer program comprising instructions which, when executed by a processor of a network node for handling link adaptation (LA) of a channel, are capable of causing the network node to perform operations comprising:
 obtaining a channel quality value for each Transmission Time Interval (TTI) in a set of TTIs;
 estimating a probability that a specific channel quality will occur from the obtained channel quality values for the set of TTIs based on a distribution of channel quality values, wherein the probability is estimated by a probability distribution estimation of the channel quality values; and
 determining a set of transmission parameters which optimizes a target function of LA, based on the estimated probability for the channel quality, wherein the set of transmission parameters for which required channel quality for successful reception is known is mapped to a probability of successful reception when applying the set of transmission parameters, based on the probability distribution estimation of the channel quality values.

10. The non-transitory computer-readable storage medium according to claim 9, wherein the probability distribution estimation is performed by estimating parameters for a Gaussian mixture mode model.

11. The non-transitory computer-readable storage medium according to claim 9, wherein the instructions are capable of causing the network node to perform further operations comprising:
 applying the determined set of transmission parameters which optimizes the target function of LA.

12. The non-transitory computer-readable storage medium according to claim 9, wherein the channel quality is obtained by receiving channel quality measurements from a user equipment (UE).

13. The non-transitory computer-readable storage medium according to claim 9, wherein the channel quality is a Signal-to-Interference-plus-Noise Ratio (SINR), Gain to Interference plus Noise Ratio (GINR), or a received bit information.

14. The non-transitory computer-readable storage medium according to claim 9, wherein the set of transmission parameters is any one of a Modulation and Coding Scheme (MCS), a transmission power, a modulation scheme, a coding rate, a bandwidth and a transmission time.

15. The non-transitory computer-readable storage medium according to claim 9, wherein the target function is any one of a maximum throughput, a desired level of robustness, a desired probability of errors, and a minimized packet latency.

16. The non-transitory computer-readable storage medium according to claim 9, wherein the target function is a maximum throughput and the set of transmission parameters which optimizes the target function of LA is determined by:
 calculating an estimated bit rate for each available set of transmissions parameters, wherein the estimated bit rate for each available set of transmission parameters is a sum of products of a rate of successfully transmitted blocks for the set of transmission parameters for each channel quality value, the probability for each channel quality value and a Transport Block Size (TBS) corresponding to each set of transmission parameters; and
 selecting the set of transmission parameters which maximizes the estimated bit rate.

* * * * *